Figure 1:
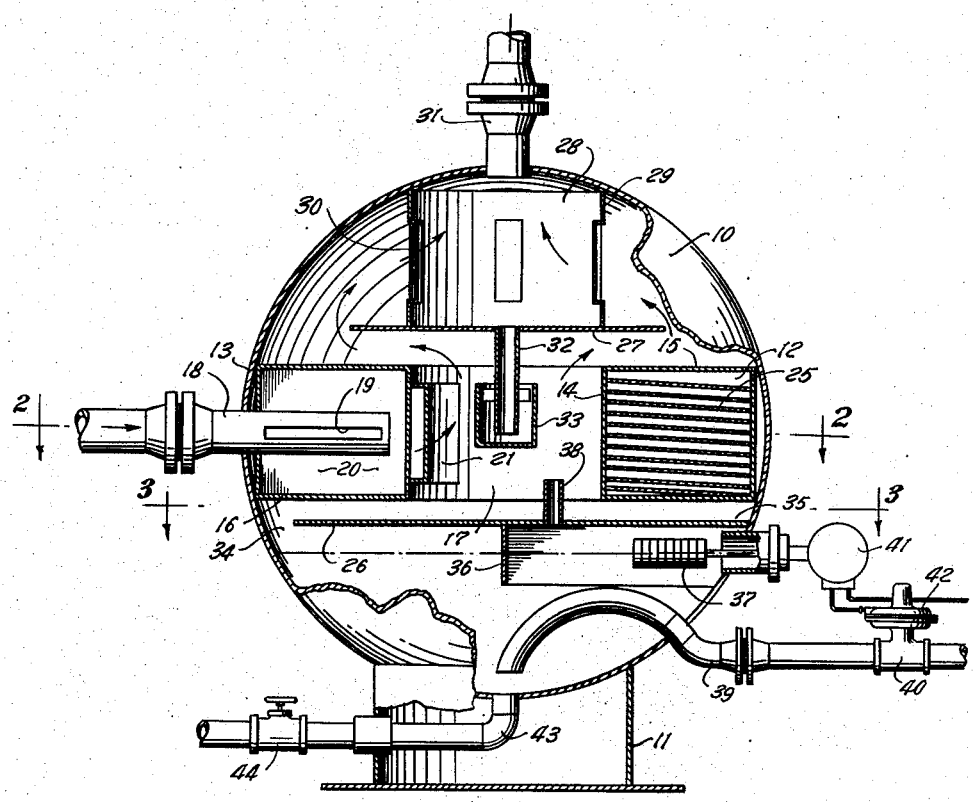

Sept. 8, 1959

C. O. GLASGOW 2,903,087

OIL AND GAS SEPARATORS

Filed Oct. 8, 1956

3 Sheets-Sheet 1

INVENTOR
Clarence O. Glasgow

BY *Ahley & Ahley*

ATTORNEYS

Sept. 8, 1959  C. O. GLASGOW  2,903,087
OIL AND GAS SEPARATORS
Filed Oct. 8, 1956  3 Sheets-Sheet 2

INVENTOR
Clarence O. Glasgow

BY

ATTORNEYS

Sept. 8, 1959     C. O. GLASGOW     2,903,087
OIL AND GAS SEPARATORS

Filed Oct. 8, 1956     3 Sheets-Sheet 3

INVENTOR
Clarence O. Glasgow

ATTORNEYS

United States Patent Office

2,903,087
Patented Sept. 8, 1959

2,903,087

OIL AND GAS SEPARATORS

Clarence O. Glasgow, Tulsa, Okla., assignor to National Tank Company, Tulsa, Okla., a corporation of Nevada Application October 8, 1956, Serial No. 614,399

12 Claims. (Cl. 183—2.7)

This invention relates to new and useful improvements in oil and gas separators.

The invention is particularly concerned with an improved oil and gas separator which is relatively small and compact, which is inexpensive to manufacture, and which performs an efficient and effective resolution of a petroleum well stream into its liquid and gaseous components.

One object of the invention is to provide an improved oil and gas separator in which the well stream is conducted through a primary separation zone for trapping relatively large bodies and droplets of liquid and separating them from the gaseous portion of the well stream, followed by a secondary separation step in which finer liquid particles are removed from the gaseous stream, both steps being carried out while the well stream is being subjected to centrifugal separation, and being followed by more conventional separation procedures in which the gas is thoroughly denuded of liquid particles and the liquid is accumulated in a relatively quiet chamber for controlled discharge from the separation vessel.

An important object of the invention is to provide an improved oil and gas separator which, to a considerable extent, achieves the advantageous performance characteristics of both horizontal and vertical separators as heretofore known, and which, in addition, combines the separatory procedures of horizontal and vertical separators in a single vessel or single zone whereby such procedures are effectively carried out in one operation.

A further object of the invention is to provide an improved oil and gas separator which utilizes substantially all of the beneficial separation steps of a conventional vertical separator, but which makes provision in a single vessel for complementing such steps by passage of the well stream through a horizontal separation chamber in which substantially all of the desirable separation steps of a horizontal separator are realized while simultaneously subjecting the well stream to centrifugal separation.

A still further object of the invention is to provide an improved oil and gas separator particularly adapted to handle well streams including foamy oil or oil which displays tendencies to foam, and in which the liquid portions are initially separated from the well streams to a point of quiescent accumulation while the foam or foamy portions of the stream, along with the gas thereof, is conducted through scrubbing and foam-breaking steps for ultimate resolution into liquid and gaseous phases, there being provision for excluding the foamy portions of the well stream from the liquid accumulation zone and for utilizing the scrubbing and foam breaking portions of the separator primarily for handling of gas and foam so that the volume capacity of such portions is not reduced by passage of liquid portions of the well stream therethrough.

Yet another object of the invention is to provide an improved oil and gas separator of the character described which is especially effective in the handling of well streams containing sand or other solids.

Constructions designed to carry out the invention will be hereinafter described, together with other features of the invention.

Figure 4:
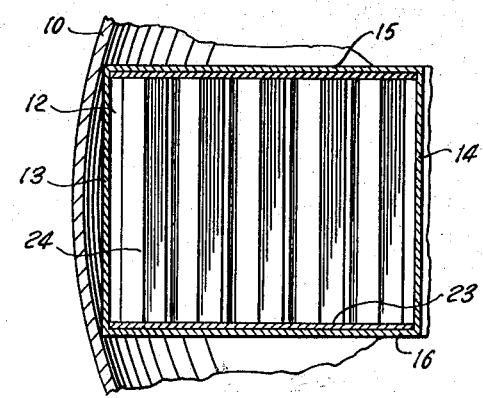
Figure 2:
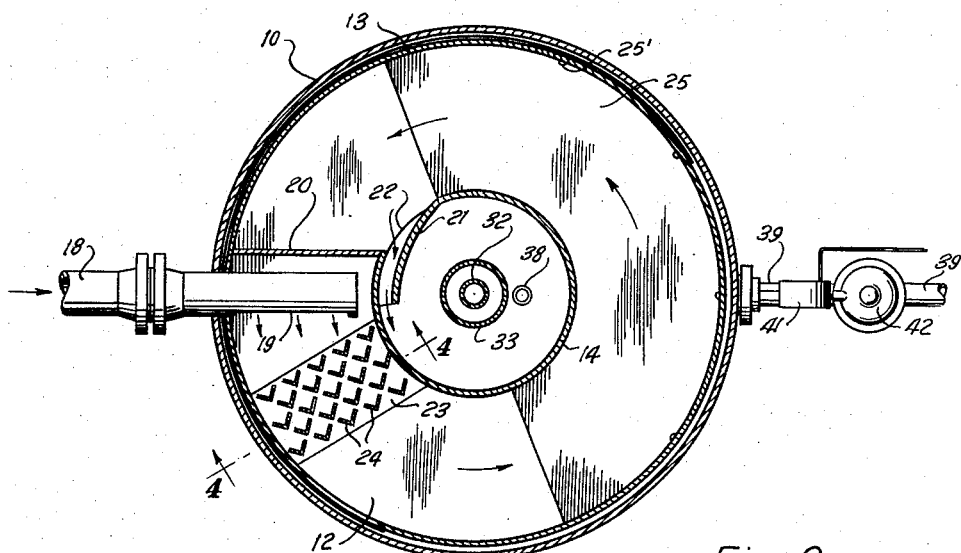
Figure 3:
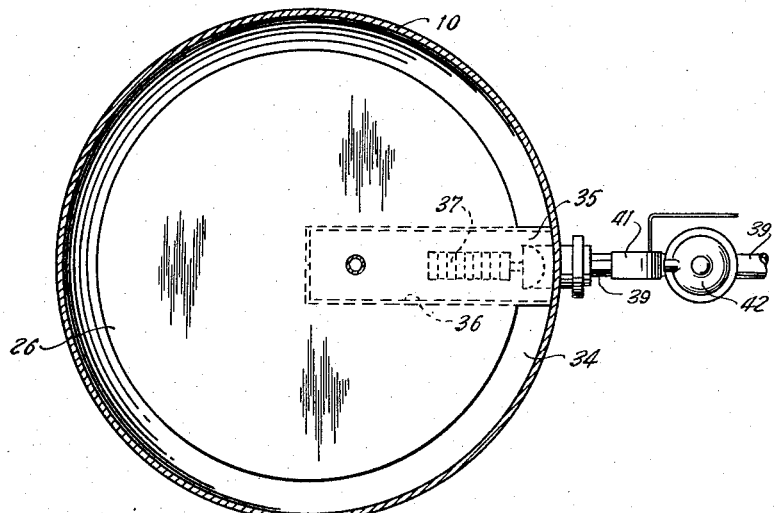
Figure 5:
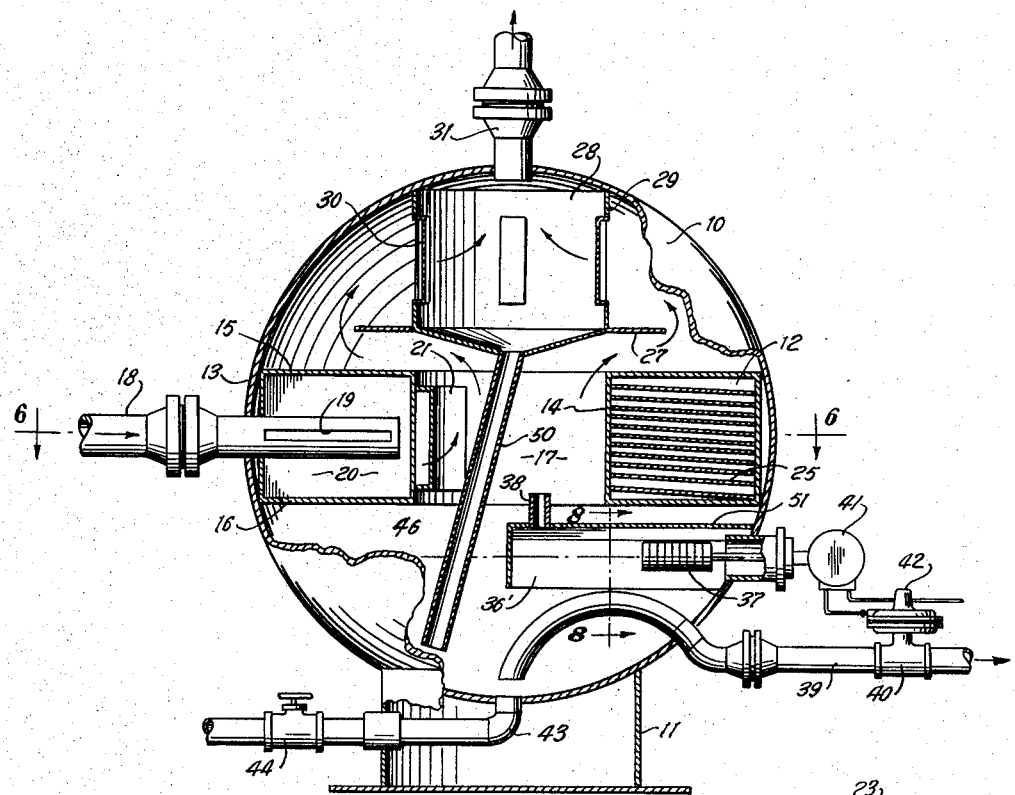
Figure 6:
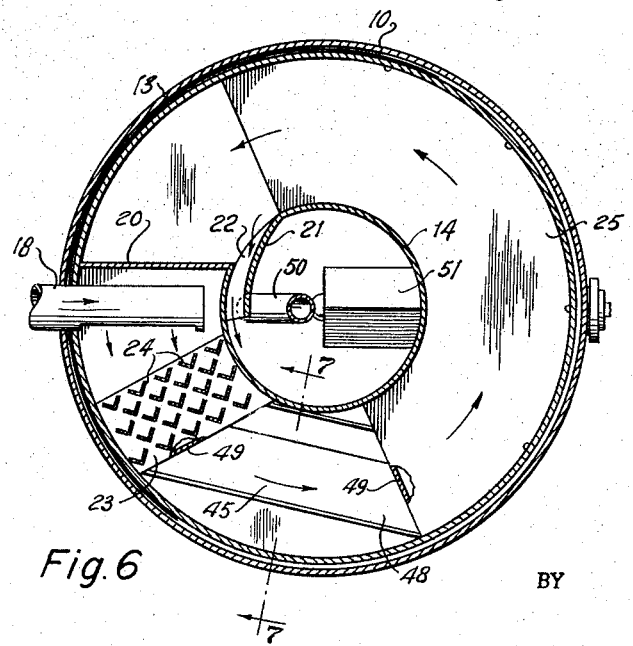
Figure 7:
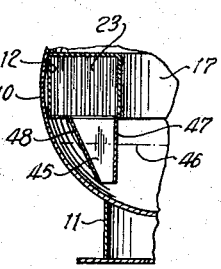
Figure 8:
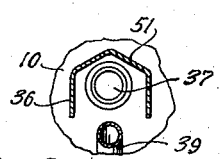

The invention will be more readily understood from a reading of the following specification and by reference to the accompanying drawings, wherein examples of the invention are shown, and wherein:

Fig. 1 is a vertical, sectional view of an oil and gas separator constructed in accordance with this invention, Figs. 2 and 3 are horizontal, sectional views taken upon the respective lines of Fig. 1, Fig. 4 is a vertical, cross-sectional view taken upon the line 4—4 of Fig. 2, Fig. 5 is a vertical, sectional view of a modified form of the oil and gas separator constructed in accordance with this invention, Fig. 6 is a horizontal, cross-sectional view taken upon the line 6—6 of Fig. 5, Fig. 7 is a reduced, vertical, fragmentary, sectional view taken upon the line 7—7 of Fig. 6, and Fig. 8 is a fragmentary sectional view taken upon the line 8—8 of Fig. 5.

In the drawings, the numeral 10 designates a substantially spherical separator vessel carried upon a suitable base or support 11. A toroidal chamber 12 of rectangular cross-section is disposed horizontally in the medial portion of the vessel 10 and includes an outer cylindrical wall 13 adjoining the inner surface of the vessel 10 at its upper and lower edges and being connected to an inner cylindrical wall 14 by top and bottom plates 15 and 16, respectively. The inner wall 14 is of such diameter as to define a centrifugal separation zone 17 of appreciable cross-sectional area, this diameter in the particular embodiment illustrated in the drawings being of the magnitude of one-third of the diameter of the vessel 10. Of course, the chamber 12 may be of any suitable or desirable dimensions or cross-section, but the rectangular cross-section has been found advantageous insofar as manufacturing economies and ease of assembly of the separator unit are concerned.

A slotted well fluid inlet pipe 18 extends through the wall of the vessel and into the interior of the chamber 12 for admitting well fluid thereto, the slot 19 of the pipe 18 being directed laterally and horizontally of the inlet pipe so as to direct the well fluid substantially horizontally and along the circular axis of the chamber 12. Immediately adjacent the inlet pipe 18 and on the side thereof opposite the slot 19, a transverse partition or wall 20 is provided for closing off the interior of the chamber 12 and forcing the incoming well stream to flow in one direction only within the chamber. A curved, tangential outlet diverter 21 overlies an outlet opening 22 formed in the inner wall 14 of the chamber 12 for receiving well fluids from the chamber immediately in advance of the partition 20 and directing said fluids tangentially and circumferentially into the zone 17 and along the inner face of the wall 14.

For removing larger bodies and drops or particles of oil and liquids from the incoming well stream, a preliminary separating unit 23 extends vertically of the cross-section of the chamber 12 in relatively close proximity to the outlet slot 19 of the inlet pipe 18 so as to receive the well fluids shortly after their admission to the chamber 12 through said slot 19. The unit 23 may be of any suitable or desirable construction, it having been found desirable to form the unit of a plurality of rows of spaced and staggered impingement elements 24 extending vertically of the chamber 12 and being V-shaped in cross-section with the open portion of the V facing the incoming well stream. The unit 23 functions to reduce the initial velocity of the incoming well stream, to absorb the kinetic energy of flow of the stream, and by impingement of liquid particles upon the multitude of vertical elements 24, as well as the circuitous flow around said elements which the well stream is caused to undergo, to trap and collect substantially all of the larger bodies of liquid which enter the separator, along with the majority of the larger droplets of liquid which may be present therein. This liquid gravitates to the bottom of the chamber 12 and flows therealong upon the bottom plate 16 while the gaseous portion of the stream continues through the upper portion of the chamber.

A multiplicity of horizontal, closely-spaced trays or baffles 25 are provided within the chamber 12 between the unit 23 and the outlet 22, the trays being substantially semi-circular in shape so as to extend throughout approximately one-half the chamber 12 and being of such width as to extend from the inner wall 14 of the chamber 12 to the outer wall 13 thereof. The assembly of trays or baffles also extends throughout the height of the chamber so that the entire gaseous portion of the well stream is caused to flow between the plates in shallow, elongate, ribbon-like paths, and separated liquids are also caused to flow through similar paths in the lower portion of the tray or baffle assembly. The portion or percentage of the interior of the chamber 12 occupied by the trays 25 is not especially critical, but in general, it is desirable that the trays be made to extend throughout a considerable part or the major portion of the chamber 12 to provide the shallow ribbon-like flow passages of as great length as possible. Of course, conservation of material and economy of manufacture is achieved by extending the trays throughout one-half of the circumference of the chamber 12 since two trays may be cut from a single circular sheet and scrap or wastage of metal minimized.

In flowing between the relatively closely-spaced trays 25, an opportunity is provided for the settling of relatively small liquid particles from the gaseous portion of the well stream, and due to the shallowness of the ribbon-like flow paths, each droplet must gravitate or settle only a relatively short distance before impinging upon one of the trays and being held thereby. Once a liquid droplet has touched and wetted one of the trays 25, it tends to cling to the tray and is rather difficult to remove therefrom by the gas stream passing thereover. The efficient separating action hereby achieved is set forth in the United States patent to Dixon, No. 2,349,944.

At the same time, liquids separated from the well stream by the unit 23, along with liquids settling to the bottom plate 16 in the space between the unit 23 and the inlet edges of the trays 25 and liquids separated in initial portions of the trays 25, are all caused to flow horizontally in a plurality of elongate ribbon-like flow paths between the lowermost of the trays 25. This results in a scrubbing of the liquids and the removal of gas therefrom, the total result being the discharge at the outlet ends of the trays 25 of a gaseous portion of the well stream which has been rather thoroughly denuded of liquid particles, along with a liquid portion which has been scrubbed of minute gas bubbles which might be present therein.

As shown in Fig. 1, the trays 25 are preferably inclined slightly downwardly toward the outer wall 16 of the chamber 12 to facilitate the draining of collected liquids from the surfaces of the trays and to cause such draining to take place in a direction in which it will be aided by the impetus and the centrifugal effect of the arcuately flowing well stream. Further, small drain ports 25' may be provided at the outer edges of the trays, as shown in Fig. 2, to pass collected liquids downwardly to the bottom of the chamber 12.

The liquid and gaseous streams flowing from the trays 25 are discharged through the opening 22 and directed by the diverter box 21 circumferentially and tangentially of the inner wall 14 and the separation zone 17. Here, the gas stream is subjected not only to a centrifugal separation action, but also to a scrubbing about the inner periphery of the wall 14, while the liquid portion also receives scrubbing and centrifugal separation.

The top and bottom of the zone 17 are open so that the separated liquids are discharged downwardly onto a barrier plate 26 while the gaseous portion flows upwardly and encounters a diverter plate 27. The plate 27 forms the bottom of a mist eliminator 28 of any suitable or conventional design, but extends outwardly of the walls 29 of the mist eliminator so that the gaseous portion of the well stream is forced to flow outwardly over the upper wall 15 of the chamber 12 and then to reverse sharply its path of travel to enter the inlet openings 30 in the side wall of the mist eliminator 28. Thus, the gaseous portion is given a further centrifugal separation action and further scrubbing upon the walls of the upper portion of the vessel 10. Within the mist eliminator, the final traces of liquid are removed from the gaseous portion, and the separated gas is discharged through a gas outlet conductor 31 extending upwardly from the vessel 10. Liquids separated in the eliminator 28 gravitate downwardly through a drain conductor 32 extending axially downwardly into the zone 17 and being provided at its lower end with a liquid seal cup 33 which prevents gas from flowing upwardly through the drain conductor 32.

The plate 26 is circular in shape and is positioned horizontally immediately below the bottom wall 16 of the chamber 12 so as to receive the separated liquids immediately as they drop from the zone 17. As shown in Fig. 3, the plate 26 is only slightly less in diameter than the diameter of the vessel 10 in the plane in which the plate 26 is positioned so as to form a relatively narrow annular opening 34 through which the liquids may be passed into the bottom of the vessel 10. At one side, the plate 26 is provided with a narrow ear or tab 35 extending to the wall of the vessel 10 and overlying an open-bottom float box or quieting chamber 36 within which a liquid level control float 37 is positioned. A gas vent 38 extends upwardly from the box or chamber 36 into the lower portion of the zone 17 for preventing the accumulation of excessive quantities of gas within the chamber 36.

In flowing over the upper surface of the plate 26 to the opening 34, the separated liquids will be spread out into a thin film over substantially the entire upper surface of the plate and thus provide a final opportunity for scrubbing of the liquids, and more important, for the separation by difference in density of small bubbles of gas from the liquid whereby a substantially gas-free liquid flows through the annular opening 34 into the bottom of the vessel 10. The plate 26 also functions as a shield or protective barrier to isolate the turbulence of the upper portion of the separator from the liquid accumulation space in the bottom thereof, and thus insures that a relatively quiescent body of liquid will be maintained. The open-bottom box 36 further isolates the surface of the liquid within the box from that without the box and the remainder of the separator vessel, whereby the float 37 is enabled to respond to the level of a very quiet body of liquid within the chamber 36.

An oil outlet conductor 39 extends from the lowermost portion of the vessel 10 through the side wall thereof and through an oil outlet valve 40. The valve 40 may be operated in any suitable or desirable fashion, there being provided in the illustrated embodiment of the invention a conventional pilot valve 41 which is controlled by the movement of the float 37 to admit or discharge actuating gas under pressure to the actuating diaphragm 42 of the valve 40 and cause the valve to open and close, or to partially open and discharge separated liquids from the vessel 10 at substantially the rate of accumulation of such liquids in said vessel. Float-controlled discharge valves of this type are well known in the petroleum industry and further description thereof is thought unnecessary.

A bottom drain conductor 43 may be provided for complete draining of the vessel 10 when so desired, such drain conductors usually extending from the lowermost point of the vessel 10 through the side of the base or support 11 and being provided with a hand-operated valve 44.

In the operation of the separator, the well stream is directed into the first separation chamber 12 wherein it is passed initially through the separator unit 23 for removal of large liquid bodies or liquid "slugs" and larger particles of liquid which may be present in the well stream. Thereafter, both the gaseous and liquid portions of the stream are passed through the multiplicity of elongate, horizontal, shallow and closely-spaced flow paths defined by the trays 25 wherein both the gas and liquid portions are thoroughly scrubbed and efficient removal of the smaller and more minute liquid particles from the gaseous portion is carried out. It is to be noted that throughout both of these separation steps the well stream is also being subjected to a centrifugal separating action by passing circumferentially of the chamber 12 and by being scrubbed upon the outer wall 13 thereof.

Next, the gaseous and liquid portions of the well stream are discharged tangentially into the zone 17 and again subjected to centrifugal separation as well as scrubbing upon the inner face of the inner wall 14 of the chamber 12. The separated gaseous portion is then directed upwardly and caused to flow over both the under and upper faces of the diverter plate 27, to undergo a sharp reversal in direction around the outer edge of the plate 27 and to be scrubbed upon the inner wall of the upper portion of the vessel 10 before passing into the final mist elimination step within the mist eliminator 28.

The separated liquids are spread into a thin film upon the plate 26 for removal of final traces of gas and for some degree of scrubbing over the upper surface of the plate before passing into the bottom of the vessel 10 for removal through the outlet conductor 39 in accordance with the raising and lowering of the float 37.

A modification of the invention is shown in Figs. 5 through 8 especially adapted for the handling of well streams containing oil of a foamy type or oil displaying tendencies to foam within a separator structure, as well as well streams which may contain appreciable quantities of sand or other solids. In many respects, this modified form of the invention is similar or substantially identical to that previously described, and in many instances, the same numerals have been employed for identification of the same parts or structural elements.

The bottom barrier plate or baffle 26 is omitted in the modified form of the invention and instead, the lower plate 16 of the annular or first separation chamber 12 is provided with a downwardly-extending flume 45 which projects downwardly into the lower portion of the vessel 10 to a point well below the surface 46 of the body of separated liquids accumulated therein. Thus, a liquid seal is provided for the bottom of the flume 45 and gas, as well as foam, may not pass downwardly therethrough.

Although the flume 45 may have any suitable or desirable configuration, it is illustrated as including a vertically depending plate 47 adjacent the inner wall 14 of the chamber 12, and an outer plate 48 depending from the bottom wall 16 adjacent the outer wall 13 of the chamber 12 and being inclined inwardly toward the vertical axis of the vessel 10 in order not to intersect the outer wall thereof. End walls 49 join the plates 47 and 48 to enclose the flume, as shown in Fig. 6, and thus, a downwardly-extending flume or conductor of relatively large cross-sectional area is provided.

The flume 45 is positioned between the initial separator assembly or unit 23 and the entrance ends of the horizontal baffle plates 25 whereby the great majority of the liquid portion of the well stream which is caught by the initial separator assembly 23 is discharged immediately and downwardly through the flume 45 into the lower portion of the separator vessel. Gas, of course, flows onwardly through the chamber 12 into the ribbon-like passages between the baffles 25 for thorough scrubbing and settling of smaller liquid particles therefrom. Any sand or other solids which may be present also flow immediately downwardly through the flume 45 and are thus prevented from accumulating upon the baffles 25 and other portions of the separating structure to impede the separating action thereof. Any foam which may be present, being lighter than the oil, cannot flow downwardly therethrough, but instead, is forced to pass through the ribbon-like, elongate, horizontal flow passages between the baffles 25 whereby the foam is thoroughly scrubbed, the films forming the foam bubbles are broken, and effective rectification of the foam into its liquid and gas components is achieved. The projecting of the flume 45 below the liquid level 46 prevents downward passage of the foam and the accumulation of a body of foam within the lower portion of the separator, and the baffles 25 are relieved of the load which would be caused by the flowing therethrough of appreciable volumes of liquid whereby the full separating capacity of the baffles may be employed for resolution of the foam into gas and liquid.

By this initial separation of the liquid portion of the well stream, followed by effective breaking and resolution of any foam which may be present, the entry of foam into the central part of the separator through the diverter 21 is prevented. In many instances, previously known separators tend to fill completely with foam when certain types of well streams are passed therethrough, and such foam ultimately passes out with the gas through the gas outlet from the separator and results in a loss of oil with the gas as well as contamination of the gas lines.

Further changes in the modified form of the invention include the replacing of the drain conductor 32 with an elongate drain conductor 50 extending from the bottom of the mist eliminator 28 to a point near the bottom of the vessel 10, and the providing of the quieting chamber 36' with a peaked or inclined upper wall 51 whereby sand or other material may not accumulate thereon to impair the operation of the separator.

The operation of the modified form of the invention is substantially the same as that previously recited for the first form of the invention with the exception that the bulk of the liquid present in the well stream is removed from the annular flow path in the chamber 12 immediately after the passage of the well stream through the primary separating unit 23, and the baffles 25 are utilized primarily as a foam-resolving means and for denuding the gas of liquid particles.

The vessel 10 may be of any suitable or desirable size, shape, or configuration, the spherical shape having been found desirable for compactness as well as for the enclosing of a separation zone of a given volume with a minimum requirement for tank or vessel shell material. Further, a spherical vessel having a certain wall thickness may usually be operated at a higher pressure than a cylindrical vessel of the same wall thickness, and hence, a saving of metal is realized in constructing a vessel for operation at a particular internal pressure.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An oil and gas separator including, a separator vessel, walls within the vessel enclosing a toroidal separation chamber disposed horizontally and medially of the vessel, one of said walls being a vertical cylindrical wall defining the core of the toroidal chamber and surrounding a second separation zone, the cylindrical wall having an opening therein, a well stream inlet conductor to the toroidal chamber, means cooperating with the opening in the cylindrical wall for flowing all the well fluids from the toroidal chamber tangentially onto the inside of the vertical cylindrical wall surrounding the second separation zone, said zone being in communication with the upper and lower portions of the separator vessel above and below the toroidal chamber, and gas and oil outlets from the upper and lower portions respectively of the separator vessel.

2. An oil and gas separator including, a separator vessel, walls in the vessel forming a toroidal first separation chamber with an elongate horizontal arcuate flow path, a well stream inlet conductor to the first separation chamber, a plurality of elongate arcuate closely-spaced baffles within the first separation chamber defining a plurality of elongate arcuate ribbon-like flow passages, the first separation chamber having its inner periphery defined by a vertical cylindrical wall enclosing a second separating zone, the cylindrical wall having an opening therein, means cooperating with the opening for flowing all the gaseous portion of the well fluids from the first separation chamber tangentially onto the inside of the vertical cylindrical wall of the second separating zone, and means for withdrawing gas and oil from the separator vessel.

3. An oil and gas separator as set forth in claim 2, a first transverse baffle in the vessel above the second separating zone, a second transverse baffle in the vessel below said zone, said first and second baffles being of greater diameter than said zone, a gas outlet from the vessel above the first baffle, and an oil outlet from the vessel below the second baffle.

4. An oil and gas separator, including, a separator vessel, walls within the vessel enclosing a toroidal separation chamber disposed horizontally and medially of the vessel, one of said walls being a vertical cylindrical wall defining the core of the toroidal chamber and surrounding a second separation zone, the cylindrical wall having an opening therein, a well stream inlet conductor to the toroidal chamber, means cooperating with the opening in the cylindrical wall for flowing all the gaseous portion of the well fluids from the toroidal chamber tangentially onto the inside of the vertical cylindrical wall surrounding the second separation zone, said zone being in communication with the upper and lower portions of the separator vessel above and below the toroidal chamber, and gas and oil outlets from the upper and lower portions respectively of the separator vessel.

5. An oil and gas separator including, a spherical separator vessel, walls within the vessel enclosing a toroidal separation chamber disposed horizontally and medially of the vessel, one of said walls being a vertical cylindrical wall defining the core of the toroidal chamber and surrounding a second separation zone, the cylindrical wall having an opening therein, a well stream inlet conductor to the toroidal chamber, means cooperating with the opening in the cylindrical wall for flowing all the gaseous portion of the well fluids from the toroidal chamber tangentially onto the inside of the vertical cylindrical wall surrounding the second separation zone, said zone being in communication with the upper and lower portions of the separator vessel above and below the toroidal chamber, and gas and oil outlets from the upper and lower portions respectively of the separator vessel.

6. An oil and gas separator as set forth in claim 5, a first transverse baffle in the separator vessel above the second separation zone, and a second transverse baffle below said zone, both the first and second baffles being of greater diameter than the zone and being spaced closely thereto.

7. An oil and gas separator as set forth in claim 5, a first transverse baffle in the separator vessel above the second separation zone, and a second transverse baffle below said zone, the first baffle being of greater diameter than the zone, and the second baffle being of only slightly lesser diameter than the separator vessel in the plane of said second baffle.

8. An oil and gas separator as set forth in claim 5, and a plurality of elongate arcuate substantially horizontal closely-spaced baffles in the toroidal chamber between the inlet and outlet thereof, said elongate baffles defining a plurality of elongate ribbon-like flow passages for the well stream fluids.

9. An oil and gas separator as set forth in claim 8, wherein the elongate baffles are inclined slightly downwardly toward the outer periphery of the toroidal chamber.

10. An oil and gas separator as set forth in claim 8, and a preliminary separation unit in the toroidal chamber between the inlet thereto and the elongate baffles and spaced from the elongate baffles.

11. An oil and gas separator as set forth in claim 10, and a flume depending in the vessel from the toroidal chamber between the preliminary separation unit and the elongate baffles.

12. An oil and gas separator including a separator vessel, walls within the vessel forming a first separation chamber with an elongate horizontal flow path, a well stream inlet to the first separation chamber, means for maintaining separated liquids in the lower portion of the vessel at a predetermined liquid level and withdrawing liquids from the vessel, a preliminary separation unit in the first separation chamber adjacent the well stream inlet, means in the first separation chamber spaced from the preliminary separation unit for resolving foam into its liquid and gas components, a flume depending from the first separation chamber between the preliminary separation unit and the foam-resolving means for conducting liquids separated in the preliminary separation unit downwardly from the first separation chamber, the lower end of the flume being disposed below the liquid level in the vessel so as to have a liquid seal, means for flowing all the gaseous portion of the well fluids from the first separation chamber tangentially onto the inside of an arcuate internal wall of the separator, a transverse baffle in the separator vessel above the arcuate internal wall and being of a greater diameter than said wall, and means for withdrawing gas from the separator vessel.

References Cited in the file of this patent

UNITED STATES PATENTS

| 2,163,095 | Kopp | June 20, 1939 |
| 2,656,896 | Glasgow | Oct. 27, 1953 |
| 2,678,699 | Fowler | May 18, 1954 |
| 2,777,533 | Segrest | Jan. 15, 1957 |